(12) United States Patent
Oowada et al.

(10) Patent No.: US 12,233,936 B2
(45) Date of Patent: Feb. 25, 2025

(54) VEHICLE STEERING APPARATUS

(71) Applicant: SUBARU CORPORATION, Tokyo (JP)

(72) Inventors: Norio Oowada, Tokyo (JP); Hiroomi Kobayashi, Tokyo (JP); Taichi Murai, Tokyo (JP); Yosuke Takebayashi, Tokyo (JP); Takeshi Yoneda, Tokyo (JP); Kaoru Sugano, Tokyo (JP); Akihiro Nabeshima, Tokyo (JP); Minoru Suyama, Tokyo (JP); Tatsuya Takayanagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 204 days.

(21) Appl. No.: 18/121,824

(22) Filed: Mar. 15, 2023

(65) Prior Publication Data

US 2023/0303170 A1 Sep. 28, 2023

(30) Foreign Application Priority Data

Mar. 23, 2022 (JP) ................. 2022-047352

(51) Int. Cl.
*B62D 17/00* (2006.01)
*B60G 17/016* (2006.01)
(52) U.S. Cl.
CPC ......... *B62D 17/00* (2013.01); *B60G 17/0163* (2013.01); *B60G 2200/4622* (2013.01)
(58) Field of Classification Search
CPC .................. B62D 6/00; B62D 17/00
See application file for complete search history.

(56) References Cited

U.S. PATENT DOCUMENTS

| 2008/0243339 | A1* | 10/2008 | Nishimori | B60G 7/003 701/41 |
| 2011/0035113 | A1* | 2/2011 | Yanagi | B62D 7/146 701/42 |
| 2011/0276231 | A1* | 11/2011 | Suzuki | B62D 5/001 701/42 |
| 2012/0097470 | A1* | 4/2012 | Yamasaki | B62D 5/0427 180/402 |

(Continued)

FOREIGN PATENT DOCUMENTS

JP 2006-56374 A 3/2006

*Primary Examiner* — Long T Tran
(74) *Attorney, Agent, or Firm* — TROUTMAN PEPPER LOCKE LLP

(57) ABSTRACT

A vehicle steering apparatus is configured to apply, to a steered wheel of a vehicle, a driving force for canceling a toe change amount caused by a road irregularity. The vehicle steering apparatus includes a road reaction force detector configured to detect a road reaction force received by a tire of the steered wheel, a toe adjustment actuator coupled to the steered wheel, and a controller configured to control a driving force of the toe adjustment actuator. The controller includes a toe change amount setter configured to set the toe change amount based on the road reaction force detected by the road reaction force detector, an operation amount calculator configured to calculate an actuator operation amount for canceling the toe change amount set by the toe change amount setter, and a driver configured to drive the toe adjustment actuator by the actuator operation amount calculated by the operation amount calculator.

8 Claims, 9 Drawing Sheets

(56) References Cited

U.S. PATENT DOCUMENTS

2015/0291210 A1* 10/2015 Kageyama ............... B62D 5/04
                                                    701/41
2021/0009199 A1*  1/2021 Ooba ..................... B62D 6/002

* cited by examiner

VEHICLE STEERING APPARATUS

CROSS-REFERENCE TO RELATED APPLICATION

The present application claims priority from Japanese Patent Application No. 2022-047352 filed on Mar. 23, 2022, the entire contents of which are hereby incorporated by reference.

BACKGROUND

The disclosure relates to a vehicle steering apparatus that causes toe adjustment actuators coupled to steered wheels to cancel toe change amounts caused when tires pass along a road with irregularities.

During traveling, forces act on tires in various directions (forward, rearward, rightward, leftward, upward, and downward directions) and at various magnitudes. The forces propagate from the tires to the body via suspensions and bushes. The geometry and the rigidities of the suspension components and the bushes are basically set to keep the tires at desired positions in terms of designing, thereby regulating tire orientations. During traveling, the effect of road irregularities may cause a possibility that displacement amounts cannot constantly be kept at zero.

Even if a driver who drives a vehicle keeps the steering wheel at its straightforward position (neutral position), the tire orientations may be displaced unexpectedly in a toe-in or toe-out direction due to the forces applied to the tires in the forward, rearward, rightward, leftward, upward, and downward directions. As a result, there is a possibility that the vehicle is turned against the driver's intention to cause unstable motion of the steering wheel, thereby reducing straightforward traveling stability.

FIGS. 12 and 13 illustrate a steering mechanism 101 as an example. When either one of tires Fr and Fl of right and left front steered wheels (right tire Fr in FIGS. 12 and 13) passes over a road bump, an upward reaction force Fu and a rearward reaction force Fb act on the tire Fr, provided that a lateral reaction force is negligible. Therefore, the toe of the right tire Fr is displaced as indicated by a broken line in FIG. 12, and the vehicle is turned in a direction that is not expected by the driver.

The driver operates the steering wheel to return the tires Fr and Fl into the straightforward direction via a steering gear box 102. Thus, the driver may have a burden caused by the operation on the steering wheel for causing the vehicle to travel straightforward.

For example, Japanese Unexamined Patent Application Publication (JP-A) No. 2006-56374 discloses the following technology. Auxiliary rack bar mechanisms are provided to rack bars laterally extending from a steering gear box, respectively, and axial force sensors are provided to the right and left auxiliary rack bar mechanisms, respectively. When a difference between axial forces generated on right and left tie rods and detected by the axial force sensors is equal to or larger than a predetermined threshold while the vehicle is traveling straightforward, a motor of the auxiliary rack bar mechanism where the axial force is larger is driven to turn the steered wheel in a direction in which the force acting on the steered wheel is reduced, thereby reducing the driver's burden.

SUMMARY

An aspect of the disclosure provides a vehicle steering apparatus configured to apply, to a steered wheel of a vehicle, a driving force for canceling a toe change amount caused by a road irregularity. The vehicle steering apparatus includes a road reaction force detector, a toe adjustment actuator, and a controller. The road reaction force detector is configured to detect a road reaction force received by a tire of the steered wheel. The toe adjustment actuator is coupled to the steered wheel. The controller is configured to control a driving force of the toe adjustment actuator. The controller includes a toe change amount setter, an operation amount calculator, and a driver. The toe change amount setter is configured to set the toe change amount based on the road reaction force detected by the road reaction force detector. The operation amount calculator is configured to calculate an actuator operation amount for canceling the toe change amount set by the toe change amount setter. The driver is configured to drive the toe adjustment actuator by the actuator operation amount calculated by the operation amount calculator.

An aspect of the disclosure provides a vehicle steering apparatus configured to apply, to a steered wheel of a vehicle, a driving force for canceling a toe change amount caused by a road irregularity. The vehicle steering apparatus include a road reaction force detector, a toe adjustment actuator, and a circuitry. The road reaction force detector includes a sensor, and is configured to detect a road reaction force received by a tire of the steered wheel. The toe adjustment actuator is coupled to the steered wheel. The circuitry is configured to control a driving force of the toe adjustment actuator. The circuitry is configured to: set the toe change amount based on the road reaction force detected by the road reaction force detector; calculate an actuator operation amount for canceling the set toe change amount; and drive the toe adjustment actuator by the calculated actuator operation amount.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

In the technology disclosed in JP-A No. 2006-56374, the displacements of the steered wheels are detected based on the axial forces detected by the axial force sensors of the right and left auxiliary rack bar mechanisms, and the motors of the auxiliary rack bar mechanisms are driven to turn the steered wheels in the directions in which the displacements are canceled.

Loads in the upward, downward, rightward, leftward, forward, and rearward directions are generated in the traveling tires to change the toes. Since the axial force sensors measure push or pull forces on the tie rods, the toe changes are not detected. Therefore, there is room to improve the straightforward traveling stability of the vehicle by reducing the effect of road irregularities.

It is desirable to provide a vehicle steering apparatus that improves the straightforward traveling stability by reducing the effect of toe changes caused when tires pass along a road with irregularities, thereby reducing a driver's burden.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
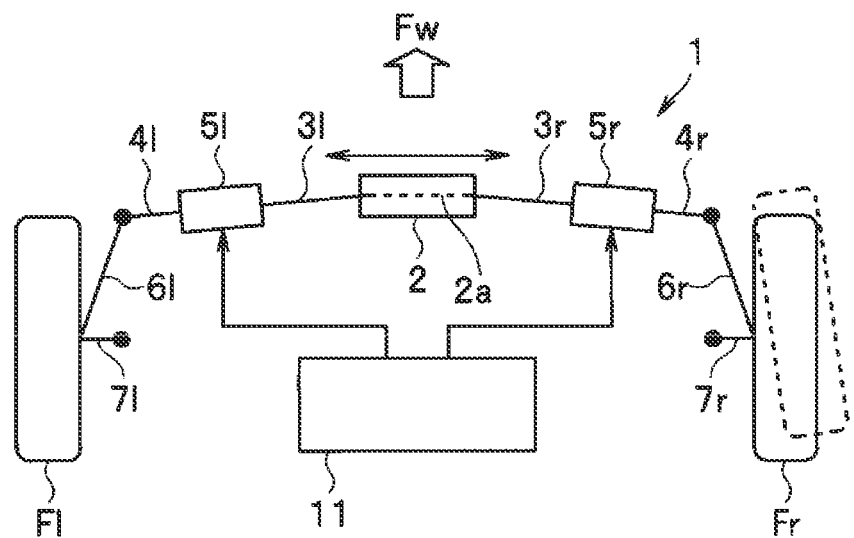
FIG. 1 is a schematic plan view of a main part of a steering apparatus according to an embodiment.

FIGS. 1 to 9 illustrate a first embodiment of the disclosure. In FIG. 1, a steering apparatus 1 includes a rack shaft 2a supported inside a steering gear box 2 to reciprocally slide in an axial direction. The rack shaft 2a has a rack (not illustrated) and a pinion of a pinion shaft meshes with the rack to constitute a rack and pinion steering gear mechanism. Although illustration is omitted, the pinion shaft is coupled to a steering shaft fixed to the proximal end of a steering wheel to be operated by a driver.

First ends of tie rods 3r and 3l are coupled to both ends of the rack shaft 2a. Second ends of the tie rods 3r and 3l and first ends of tie rod ends 4r and 4l are coupled via right and left toe adjustment actuators 5r and 5l, respectively.

Second ends of the tie rod ends 4r and 4l are coupled to knuckle arms 6r and 6l extending from right and left steering knuckles (not illustrated), respectively. The steering knuckles rotatably support tires Fr and Fl of right and left steered wheels (right and left front wheels), and are turnably supported on a vehicle body frame (not illustrated) via front arms 7r and 7l, respectively.

Figure 2:
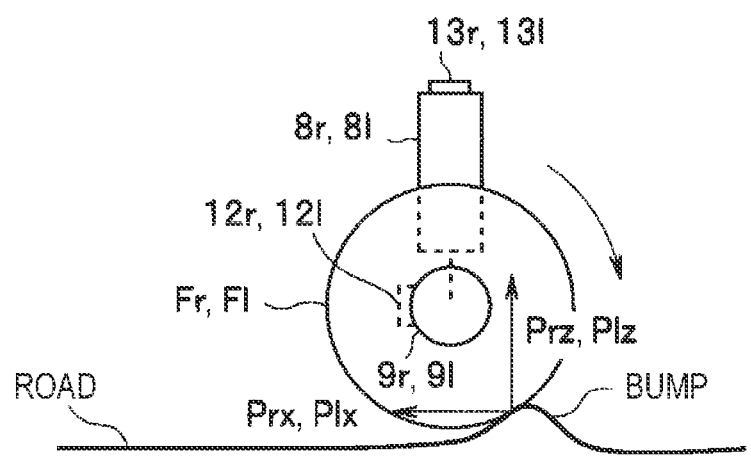
FIG. 2 is a right-hand side view of FIG. 1 according to the first embodiment.

As illustrated in FIG. 2, a tire load sensor 12r (12l) that measures longitudinal and lateral loads (road reaction forces) on the tire Fr (Fl) is provided to a hub 9r (9l) to which a tire wheel of the tire Fr (Fl) is fixed. A right or left suspension stroke sensor 13r (13l) that detects a stroke amount of a front suspension 8r (8l) (suspension stroke amount) Xr (Xl) is fixed to the front suspension 8r (8l). In one embodiment, the tire load sensors 12r and 12l and the suspension stroke sensors 13r and 13l may serve as a "road reaction force detector".

While the vehicle is traveling straightforward, the toe adjustment actuators 5r and 5l increase or reduce distances between the tie rods 3r and 3l and the tie rod ends 4r and 4l to apply, to the steered wheels, driving forces for canceling disturbances on the tires Fr and Fl of the right and left front wheels, respectively, thereby securing traveling stability. The toe adjustment actuators 5r and 5l are operated in response to drive signals transmitted from a steering control unit (steering ECU) 11. In one embodiment, the steering ECU 11 may serve as a "controller".

The steering ECU 11 is a microcontroller including a CPU, a RAM, a ROM, a rewritable non-volatile memory (flash memory or EEPROM), and peripheral devices. The ROM stores programs and fixed data for use in execution of processes by the CPU. The RAM serves as a working area for the CPU to temporarily store various types of data being used by the CPU. The CPU is also referred to as "microprocessor (MPU)" or "processor". The CPU may be replaced by a graphics processing unit (GPU) or a graph streaming processor (GSP). Alternatively, the CPU, the GPU, and the GSP may be combined selectively.

Figure 3:
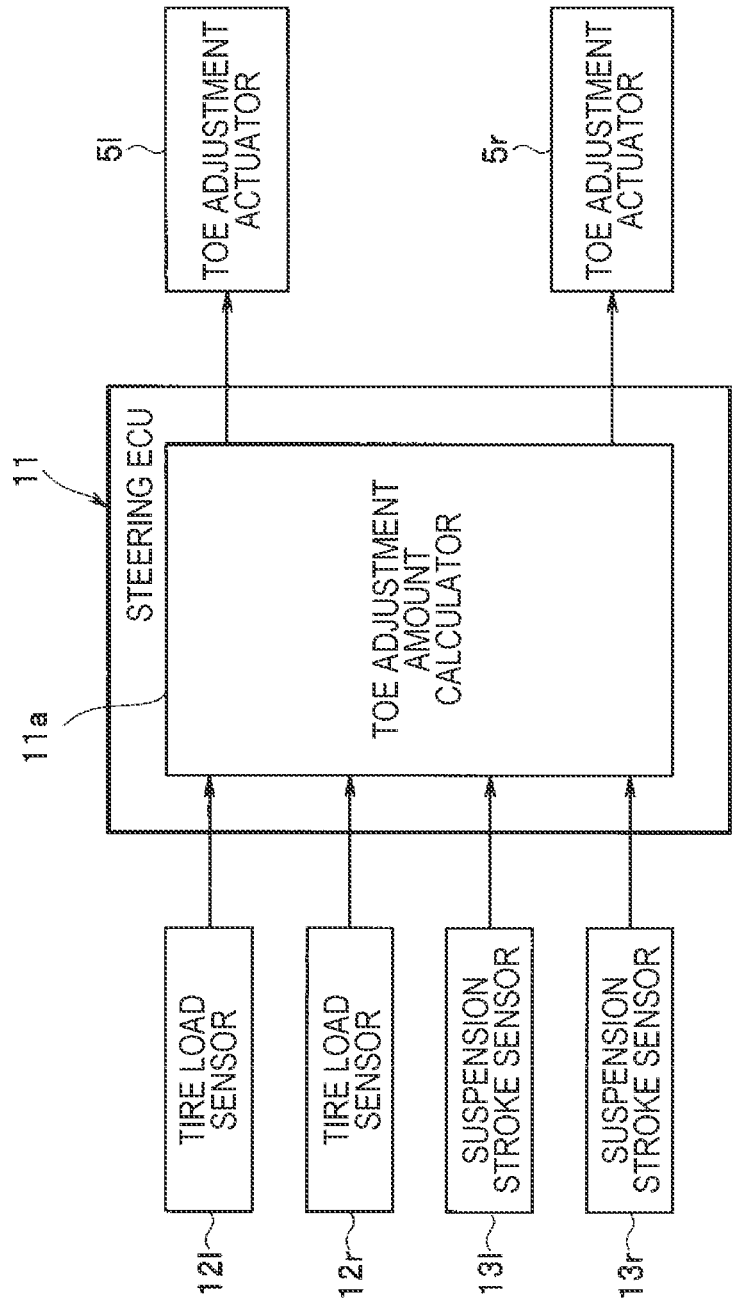
FIG. 3 is a schematic structural diagram of a steering control unit according to the embodiment.

As illustrated in FIG. 3, the steering ECU 11 includes a toe adjustment amount calculator 11a that drives the toe adjustment actuators 5r and 5l to achieve the traveling stability. The right and left tire load sensors 12r and 12l and the right and left suspension stroke sensors 13r and 13l are coupled to an input side of the toe adjustment amount calculator 11a. The right and left toe adjustment actuators 5r and 5l are coupled to an output side of the toe adjustment amount calculator 11a.

The toe adjustment amount calculator 11a calculates toe change amounts caused by road reaction forces received by the tires Fr and Fl when passing along a road with irregularities. For example, the right and left tire load sensors 12r and 12l detect lateral loads Pry and Ply and longitudinal loads Prx and Plx on the tires Fr and Fl, respectively. The right and left suspension stroke sensors 13r and 13l detect suspension stroke amounts Xr and Xl, respectively.

The toe adjustment amount calculator 11a calculates toe change amounts based on the lateral loads Pry and Ply, the longitudinal loads Prx and Plx, and vertical loads Prz and Plz, calculates actuator operation amounts for canceling the toe change amounts, and operates the right and left toe adjustment actuators 5r and 5l.

Figure 4:
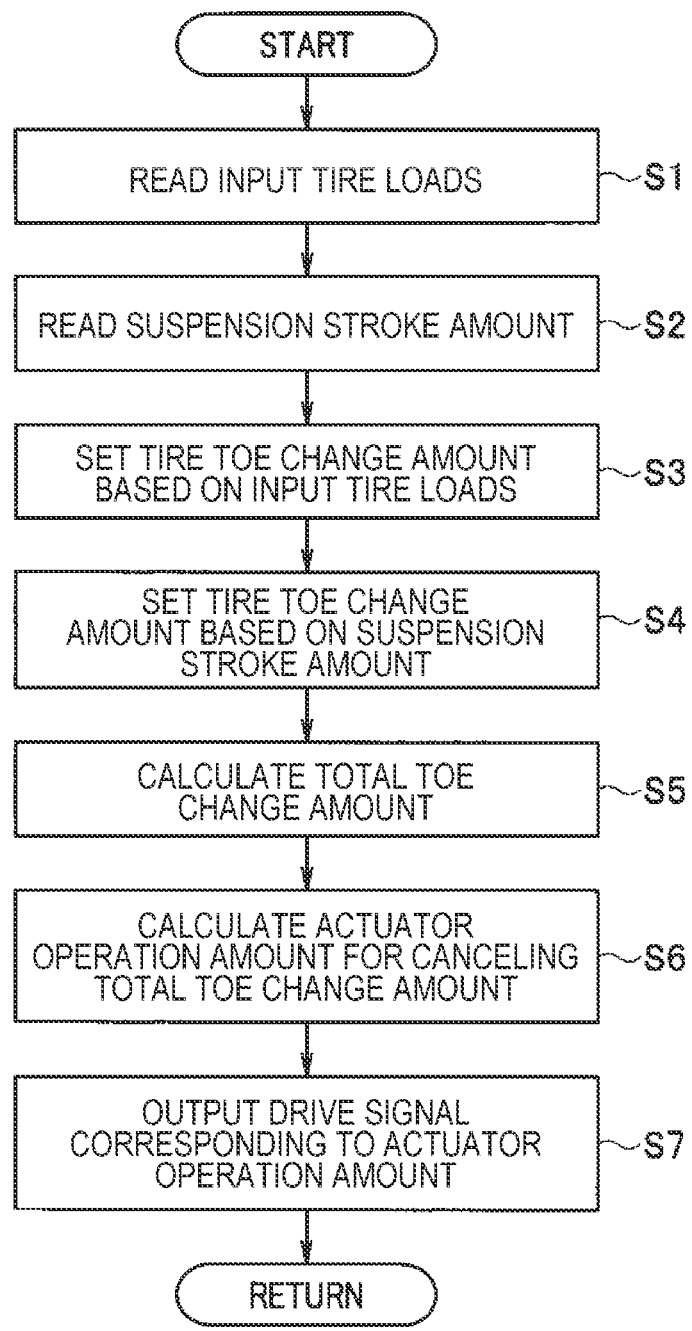
FIG. 4 is a flowchart illustrating a toe adjustment actuator operation amount calculation routine according to the embodiment.

For example, the operation amount calculation executed by the toe adjustment amount calculator 11a for the right and left toe adjustment actuators 5r and 5l is processed in accordance with a toe adjustment actuator operation amount calculation routine illustrated in FIG. 4. This routine is executed individually for the right and left toe adjustment actuators 5r and 5l and details of processes are the same. Therefore, the calculation of the operation amount of the right toe adjustment actuator 5r is described and the calculation of the operation amount of the left toe adjustment actuator 5l is denoted by parentheses.

In Step S1 of this routine, a lateral load Pry (Ply) and a longitudinal load Prx (Plx) received by the tire Fr (Fl) from a road and detected by the tire load sensor 12r (12l) are read. In Step S2, a suspension stroke amount Xr (Xl) detected by the suspension stroke sensor 13r (13l) is read.

Figure 5:
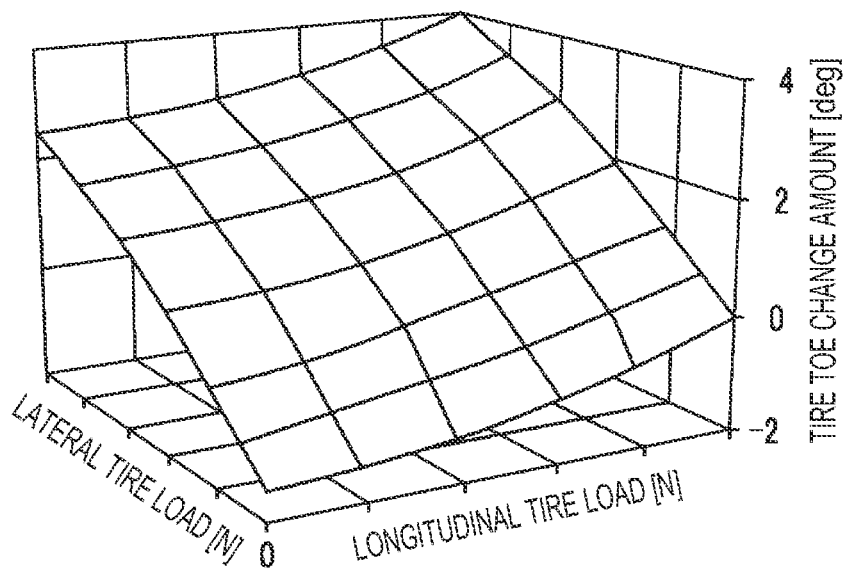
FIG. 5 is a conceptual diagram of an input tire load-tire toe change amount map according to the embodiment.

In Step S3, a tire toe change amount is set by referring to an input tire load-tire toe change amount map with interpolation based on the lateral load Pry (Ply) and the longitudinal load Prx (Plx) that are input tire loads. FIG. 5 is a conceptual diagram of the input tire load-tire toe change amount map. The tire toe change amount in the case where the lateral load Pry (Ply) and the longitudinal load Prx (Plx) are applied to the tire Fr (Fl) can be calculated in a mechanical manner. When characteristics of the vehicle are known, the tire toe change amount caused by the lateral load Pry (Ply) and the longitudinal load Prx (Plx) can be predetermined by simulation or the like based on the characteristics, and is easily plotted into a map.

For example, when the tire Fr (Fl) of the vehicle traveling straightforward passes over a bump as illustrated in FIG. 2, a load caused by the road reaction forces is applied to the tire Fr (Fl). The load includes components in three directions that are the load Prx (Plx) that pushes the tire Fr (Fl) rearward, the vertical load Prz (Plz) that pushes the tire Fr (Fl) upward, and the load Pry (Ply) (not illustrated) that pushes the tire Fr (Fl) in the lateral direction.

Figure 7:
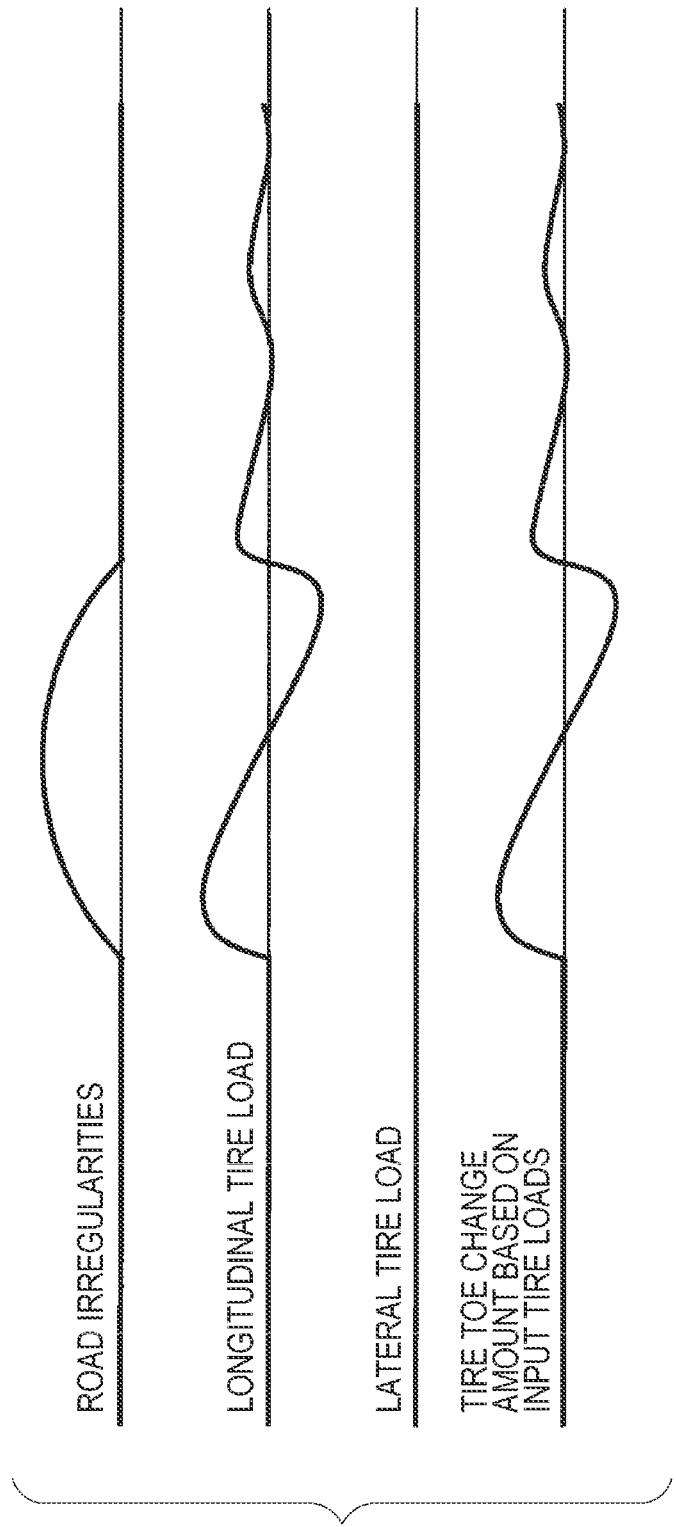
FIG. 7 is a timing chart illustrating a tire toe change amount relative to road irregularities according to the embodiment.

The tire load sensor 12r (12l) detects the longitudinal load Prx (Plx) and the lateral load Pry (Ply) among the components in the three directions, and detects changes in the longitudinal tire load and the lateral tire load as illustrated in FIG. 7. In FIG. 7, it is assumed that the lateral load Pry (Ply) is not generated for convenience. Under the assumption that the lateral load Pry (Ply) is not generated, the tire toe change amount is set to a value tracing the longitudinal load Prx (Plx).

Figure 6:
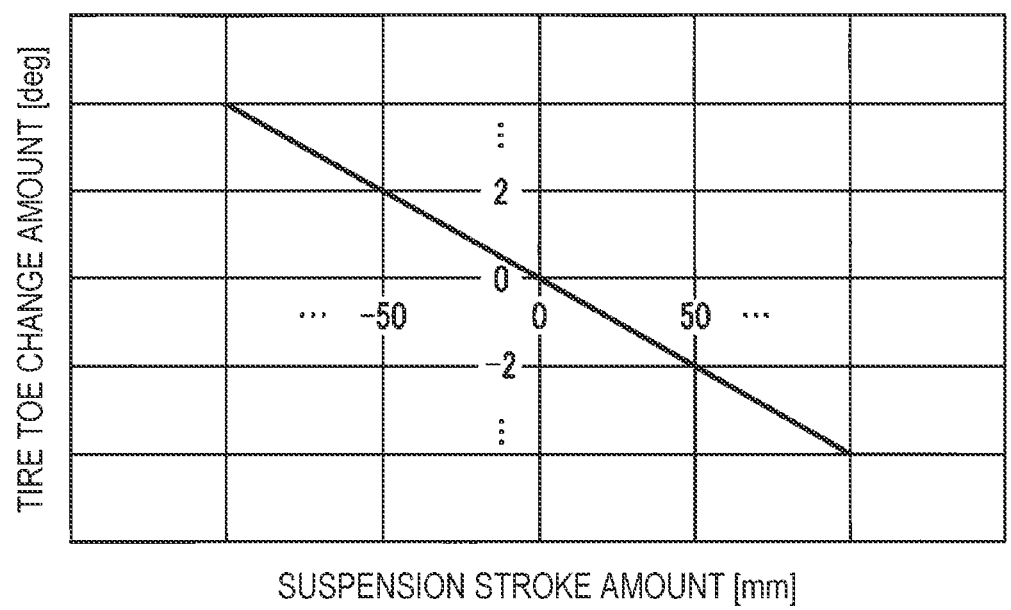
FIG. 6 is a conceptual diagram of a suspension stroke amount-tire toe change amount table according to the embodiment.

In Step S4, a tire toe change amount is set by referring to a suspension stroke amount-tire toe change amount table based on the suspension stroke amount Xr (Xl). FIG. 6 is a conceptual diagram of the suspension stroke amount-tire toe change amount table. As illustrated in FIG. 6, the suspension stroke amount Xr (Xl) is set depending on directions of extension and contraction of the suspension in a stationary state, and the tire toe change amount increases proportionally as the change amount of the suspension stroke amount Xr (Xl) increases irrespective of the extension and contraction. Thus, the suspension stroke amount Xr (Xl) and the tire toe change amount can be calculated from a primary expression having a certain slope determined based on the characteristics of the vehicle.

Figure 8:
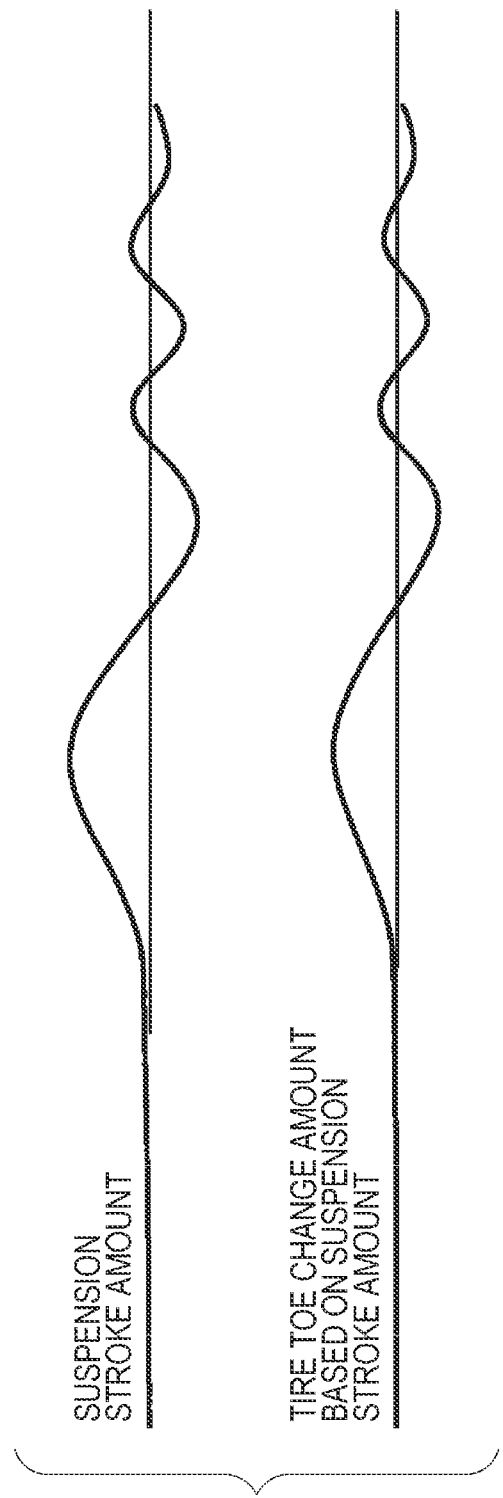
FIG. 8 is a timing chart illustrating the tire toe change amount relative to a suspension stroke according to the embodiment.

For example, when the tire Fr (Fl) of the vehicle traveling straightforward passes over a bump as illustrated in FIG. 2, the vertical load Prz (Plz) that pushes the tire Fr (Fl) upward is generated on the tire Fr (Fl) by the road reaction forces. As illustrated in FIG. 8, the suspension stroke sensor 13r (13l) detects the suspension stroke amount Xr (Xl). A tire toe change amount tracing the suspension stroke amount Xr (Xl) is set by referring to the table based on the suspension stroke amount Xr (Xl).

Figure 9:
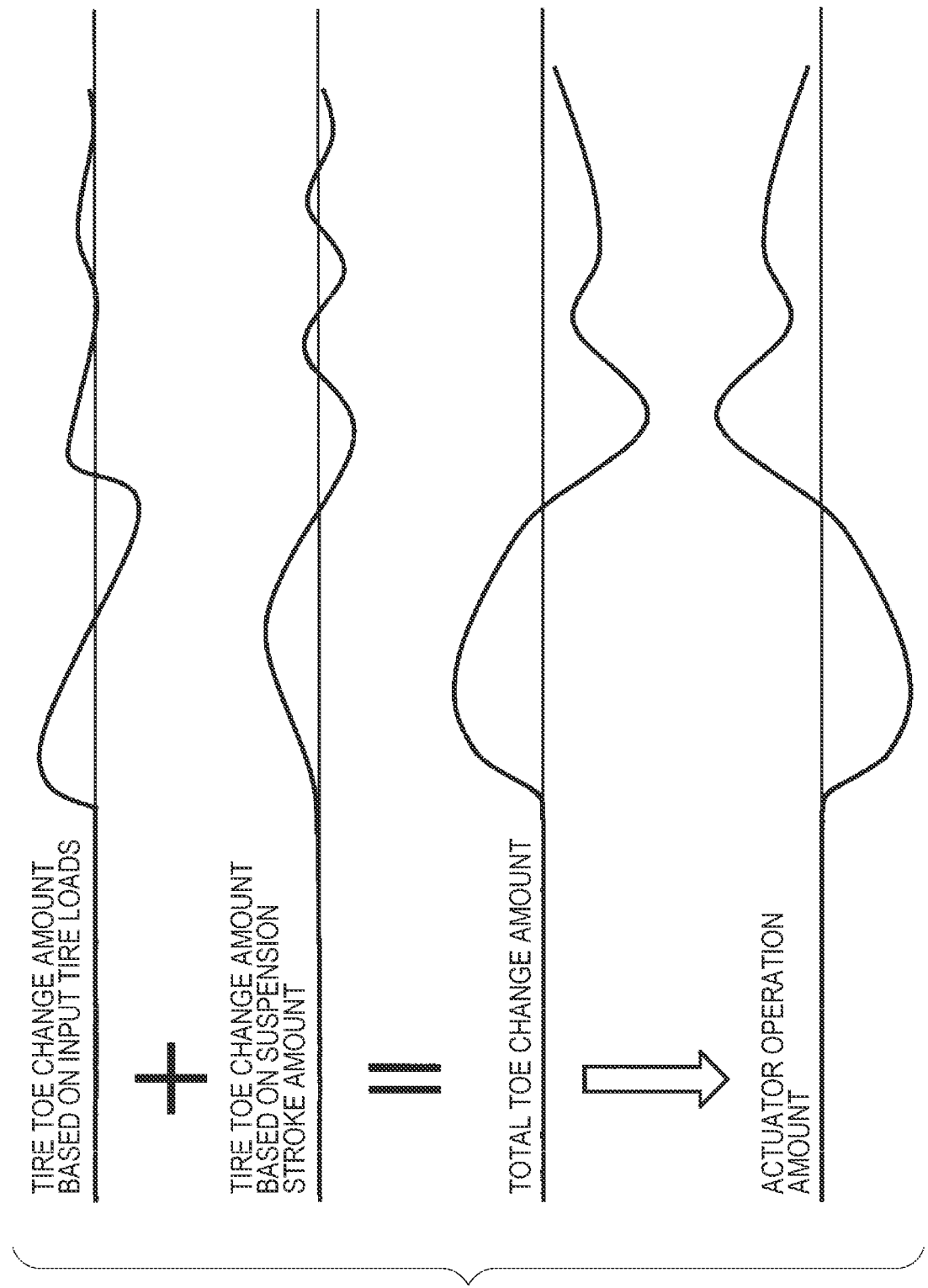
FIG. 9 is a timing chart illustrating an actuator operation amount for canceling a total tire toe change amount according to the embodiment.

In Step S5, a total toe change amount is calculated by adding the tire toe change amount set based on the input tire loads in Step S3 and the tire toe change amount set based on the suspension stroke amount in Step S4 (see FIG. 9). In one embodiment, the process of Steps S3 to S5 may serve as a "toe change amount setter".

In Step S6, an actuator operation amount in an opposite phase is calculated to cancel the total toe change amount (see FIG. 9). In one embodiment, the process of Step S6 may serve as an "operation amount calculator".

In Step S7, a drive signal corresponding to the actuator operation amount is output to the right toe adjustment actuator 5r (left toe adjustment actuator 5l). In one embodiment, the process of Step S7 may be referred to a process performed by a "driver".

As illustrated in FIG. 9, the actuator operation amount for canceling the total toe change amount is generated in the right toe adjustment actuator 5r (left toe adjustment actuator 5l) and the corresponding driving force is applied to the steered wheel having the tire Fr (Fl) to correct the tire toe. As a result, the straightforward traveling stability is improved by reducing the tire toe change caused by the effect of road irregularities, thereby reducing the burden on the driver who operates the steering wheel.

Figure 10:
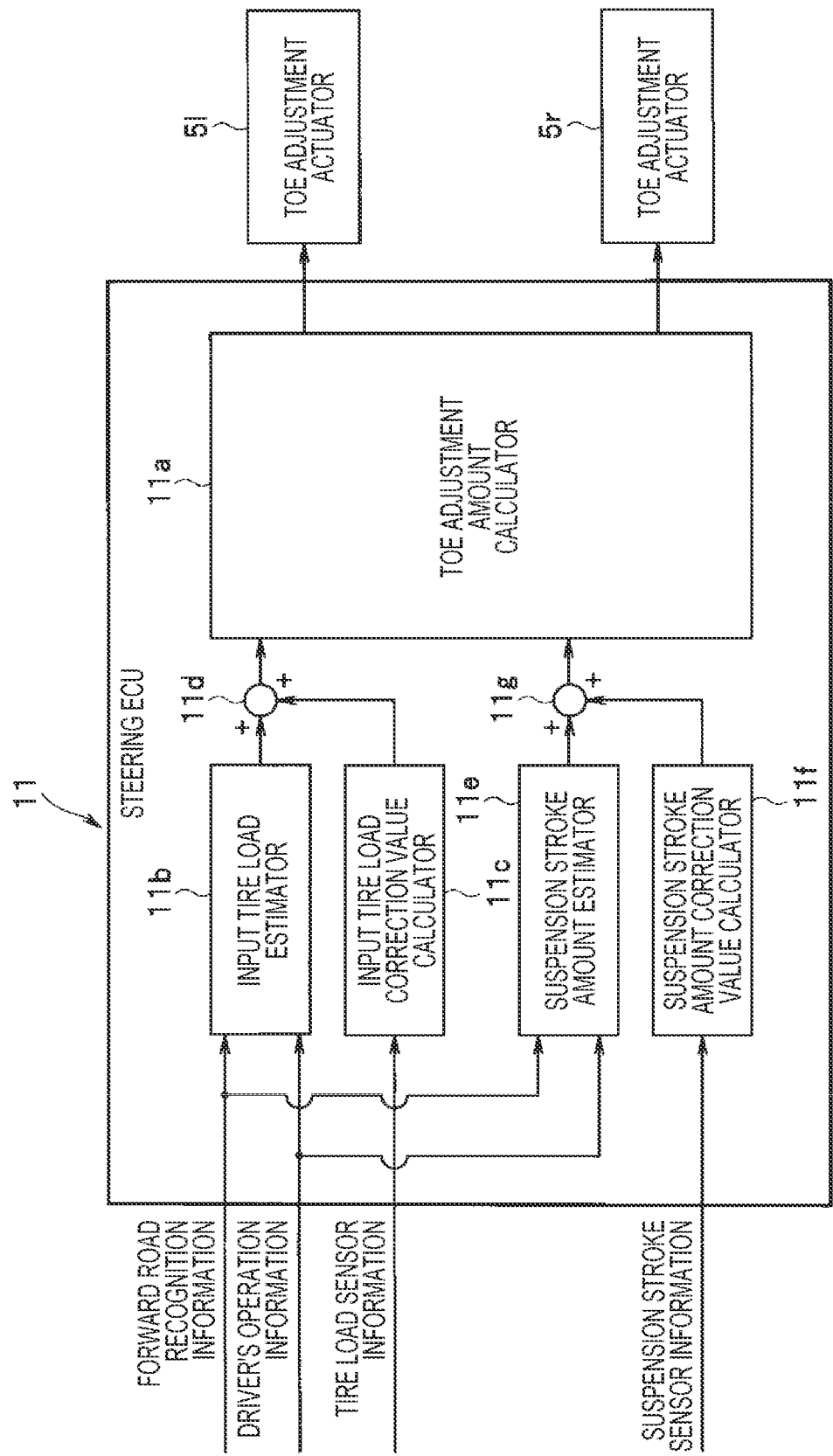
FIG. 10 is a schematic structural diagram of a steering control unit according to an embodiment.

FIG. 10 illustrates a second embodiment of the disclosure. In the first embodiment, the total toe change amount is calculated based on the input tire loads (lateral load Pry (Ply) and longitudinal load Prx (Plx)) detected by the tire load sensor 12r (12l) and the suspension stroke amount Xr (Xl) detected by the suspension stroke sensor 13r (13l).

In this embodiment, a forward road irregularity is detected during traveling, input tire loads and a suspension stroke amount are estimated based on the detected road irregularity, and the estimated input tire loads and the estimated suspension stroke amount are corrected by using input tire loads detected by the tire load sensor 12r (12l) and a suspension stroke amount Xr (Xl) detected by the suspension stroke sensor 13r (13l), respectively. The corrected input tire loads and the corrected suspension stroke amount are read in Steps S1 and S2 of the toe adjustment actuator operation amount calculation routine illustrated in FIG. 4, respectively.

As illustrated in FIG. 10, the steering ECU 11 includes, on the input side of the toe adjustment amount calculator 11a, an input tire load estimator 11b, an input tire load correction value calculator 11c, a first corrector 11d, a suspension stroke amount estimator 11e, a suspension stroke amount correction value calculator 11f, and a second corrector 11g.

The input tire load estimator 11b calculates a road irregularity amount (height or depth) based on forward road recognition information, and determines estimated input tire loads (lateral load Pry (Ply) and longitudinal load Prx (Plx)) received by the tire Fr (Fl) when passing along a road with irregularities. In one embodiment, the estimated input tire loads may be referred to an "estimated road reaction force". The input tire load estimator 11b predicts a time to reach the road irregularity based on a distance to the road irregularity and a speed of the vehicle. At the time to reach the road irregularity, the input tire load estimator 11b outputs the estimated input tire loads to the first corrector 11d. The forward road recognition information is acquired from forward traveling environment information recognized by a forward traveling environment recognizer. Examples of the forward traveling environment recognizer include a stereo camera, a millimeter wave radar, a microwave radar, and a light detection and ranging (LiDAR) sensor. Alternatively, the forward traveling environment recognizer may be a combination of a monocular camera and any radar.

The input tire load correction value calculator 11c outputs the input tire loads (lateral load Pry (Ply) and longitudinal load Prx (Plx)) detected by the tire load sensor 12r (12l) to the first corrector 11d as correction values.

The first corrector 11d determines new input tire loads by adding the correction values determined by the input tire load correction value calculator 11c to the input tire loads (lateral load Pry (Ply) and longitudinal load Prx (Plx)) estimated by the input tire load estimator 11b, and outputs the new input tire loads to the toe adjustment amount calculator 11a.

As a result, the input tire loads estimated by the input tire load estimator 11b serve as feedforward control values, and the correction values calculated by the input tire load correction value calculator 11c serve as feedback correction values. Although a slight temporal deviation occurs between the feedforward control values and the feedback correction values, feedforward control is performed on the input tire loads, and therefore the feedback control values become relatively small. Thus, a high response can be obtained.

The suspension stroke amount estimator 11e calculates a road irregularity amount based on the forward road recognition information, and determines an estimated stroke amount (estimated suspension stroke amount) received by the tire Fr (Fl) and transmitted to the front suspension 8r (8l) when passing along the road with irregularities. In one embodiment, the estimated suspension stroke amount may be referred to an "estimated road reaction force". The suspension stroke amount estimator 11e predicts a time to reach the road irregularity based on the distance to the road irregularity and the speed of the vehicle. At the time to reach the road irregularity, the suspension stroke amount estimator 11e outputs the estimated suspension stroke amount to the second corrector 11g.

The suspension stroke amount correction value calculator 11f outputs the suspension stroke amount Xr (Xl) detected by the suspension stroke sensor 13r (13l) to the second corrector 11g as a correction value.

The second corrector 11g determines a new suspension stroke amount by adding the correction value determined by the suspension stroke amount correction value calculator 11f to the suspension stroke amount estimated by the suspension stroke amount estimator 11e, and outputs the new suspension stroke amount to the toe adjustment amount calculator 11a.

As a result, the suspension stroke amount estimated by the suspension stroke amount estimator 11e serves as a feedforward control value, and the correction value calculated by the suspension stroke amount correction value calculator 11f serves as a feedback correction value. Although a slight temporal deviation similarly occurs between the feedforward control value and the feedback correction value, feedforward control is performed on the suspension stroke amount, and therefore the feedback control value becomes relatively small. Thus, a high response can be obtained.

Figure 11:
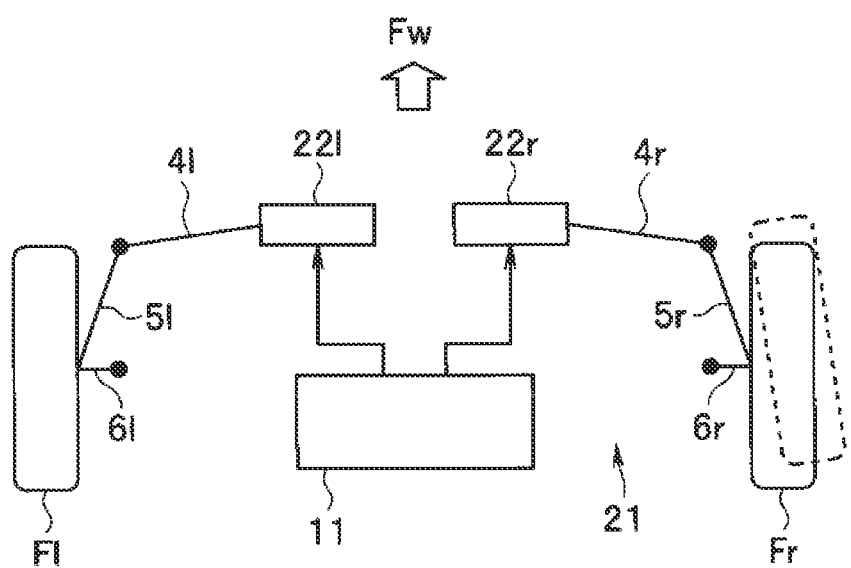
FIG. 11 is a schematic plan view of a main part of a steering apparatus according to an embodiment.
Figure 12:
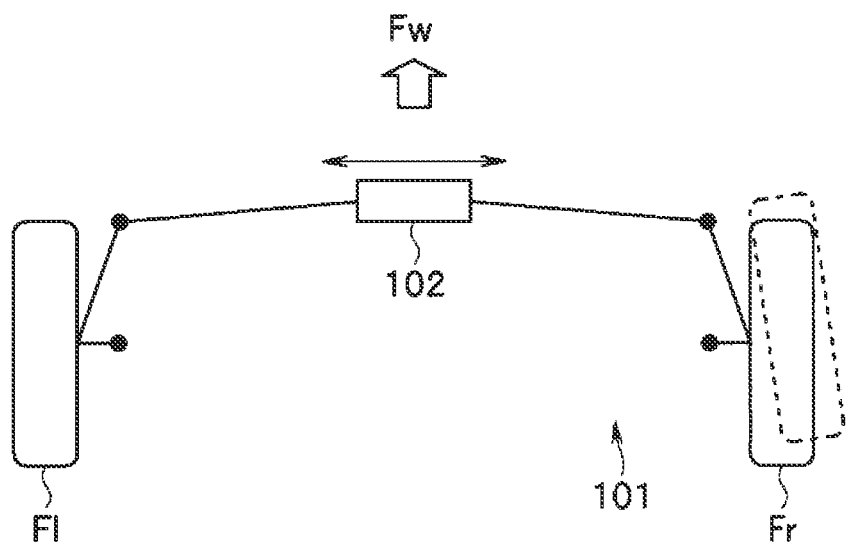
FIG. 12 is a schematic plan view of a main part of a related-art steering apparatus.
Figure 13:
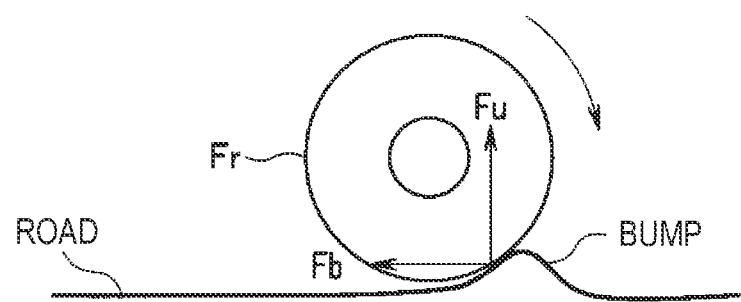
FIG. 13 is a right-hand side view of FIG. 12.

FIG. 11 illustrates a third embodiment of the disclosure. In the first embodiment, the right or left toe adjustment actuator 5r (5l) is provided in the mechanical steering apparatus 1. In this embodiment, actuator operation amounts for canceling total toe change amounts caused when passing along a road with irregularities are added to control amounts of right and left steering actuators 22r and 22l of a steer-by-wire steering apparatus 21. The actuator operation amounts are similar to those in the first and second embodiments, and therefore description thereof is omitted.

According to this embodiment, the actuator operation amounts for canceling the total toe change amounts are simply added to the control amounts of the steering actuators 22r and 22l of the existing steer-by-wire steering apparatus 21. Thus, high versatility can be obtained without adding a new mechanism.

The embodiment of the disclosure is not limited to the embodiments described above. In the embodiments, the road with a bump is described as an example, but the embodiments are also applicable to a road with a dip. Since the total toe change amounts are reduced when passing along the road with irregularities, the road with irregularities hardly affects the steering. Thus, good turning performance can be obtained.

The steering ECU 11 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the steering ECU 11 including the toe adjustment amount calculator 11a. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A vehicle steering apparatus configured to apply, to a steered wheel of a vehicle, a driving force for canceling a toe change amount caused by a road irregularity, the vehicle steering apparatus comprising:
    a road reaction force detector configured to detect a road reaction force received by a tire of the steered wheel;
    a toe adjustment actuator coupled to the steered wheel; and
    a controller configured to control a driving force of the toe adjustment actuator,
    wherein the controller comprises:
        a toe change amount setter configured to set the toe change amount based on the road reaction force detected by the road reaction force detector;
        an operation amount calculator configured to calculate an actuator operation amount for canceling the toe change amount set by the toe change amount setter; and
        a driver configured to drive the toe adjustment actuator by the actuator operation amount calculated by the operation amount calculator.

2. The vehicle steering apparatus according to claim 1, wherein the toe adjustment actuator comprises right and left toe adjustment actuators provided across a steering gear box,
    wherein the steered wheel comprises right and left steered wheels, and
    wherein the right and left toe adjustment actuators are coupled to the right and left steered wheels, respectively.

3. The vehicle steering apparatus according to claim 1, wherein the road reaction force detector comprises:
    a tire load sensor configured to detect an input load received by the tire; and
    a suspension stroke sensor configured to detect a load received by the tire in a vertical direction based on a stroke amount of a suspension.

4. The vehicle steering apparatus according to claim 2, wherein the road reaction force detector comprises:
    a tire load sensor configured to detect an input load received by the tire; and a suspension stroke sensor configured to detect a load received by the tire in a vertical direction based on a stroke amount of a suspension.

5. The vehicle steering apparatus according to claim 1, wherein the vehicle steering apparatus is a steer-by-wire steering apparatus,
wherein the steered wheel comprises right and left steered wheels, and
wherein right and left steering actuators configured to respectively and individually drive the right and left steered wheels function as the toe adjustment actuator.

6. The vehicle steering apparatus according to claim 2, wherein the vehicle steering apparatus is a steer-by-wire steering apparatus, and
wherein right and left steering actuators configured to respectively and individually drive the right and left steered wheels function as the toe adjustment actuator.

7. The vehicle steering apparatus according to claim 1, further comprising a traveling environment recognizer configured to recognize a traveling environment ahead of the vehicle,
wherein the controller comprises:
an estimator configured to detect the road irregularity ahead of the vehicle based on the traveling environment recognized by the traveling environment recognizer, and determine, based on the road irregularity, an estimated road reaction force to be received by the tire when the vehicle passes over the road irregularity;
a correction value calculator configured to calculate a correction value for correction of the estimated road reaction force based on the road reaction force detected by the road reaction force detector; and
a corrector configured to calculate a new road reaction force by correcting the estimated road reaction force determined by the estimator with the correction value calculated by the correction value calculator, and
wherein the toe change amount setter is configured to set the toe change amount based on the new road reaction force calculated by the corrector.

8. A vehicle steering apparatus configured to apply, to a steered wheel of a vehicle, a driving force for canceling a toe change amount caused by a road irregularity, the vehicle steering apparatus comprising:
a road reaction force detector including a sensor, the road reaction force detector being configured to detect a road reaction force received by a tire of the steered wheel;
a toe adjustment actuator coupled to the steered wheel; and
a circuitry configured to control a driving force of the toe adjustment actuator,
wherein the circuitry is configured to
set the toe change amount based on the road reaction force detected by the road reaction force detector,
calculate an actuator operation amount for canceling the set toe change amount, and
drive the toe adjustment actuator by the calculated actuator operation amount.

* * * * *